(12) United States Patent
Janson et al.

(10) Patent No.: US 8,068,278 B2
(45) Date of Patent: Nov. 29, 2011

(54) PHOTOSTRUCTURED IMAGING DISPLAY PANELS

(75) Inventors: Siegfried W. Janson, Redondo Beach, CA (US); Margaret Abraham, Portola Valley, CA (US)

(73) Assignee: The Aerospace Corporation, El Segundo, CA (US)

( * ) Notice: Subject to any disclaimer, the term of this patent is extended or adjusted under 35 U.S.C. 154(b) by 1071 days.

(21) Appl. No.: 11/901,910

(22) Filed: Sep. 19, 2007

(65) Prior Publication Data
US 2009/0073087 A1    Mar. 19, 2009

(51) Int. Cl.
G02B 27/24 (2006.01)
B32B 3/10 (2006.01)
(52) U.S. Cl. ............... 359/472; 359/462; 428/136
(58) Field of Classification Search ........... 359/463, 359/464, 472; 428/136; 348/52
See application file for complete search history.

(56) References Cited

U.S. PATENT DOCUMENTS

| | | | | | |
|---|---|---|---|---|---|
| 4,788,094 A | * | 11/1988 | Morita et al. | ............... | 428/136 |
| 5,254,388 A | * | 10/1993 | Melby et al. | ............... | 428/120 |
| 5,475,419 A | * | 12/1995 | Carbery | ............... | 348/59 |
| 5,723,945 A | * | 3/1998 | Schermerhorn | ............... | 313/581 |
| 5,894,364 A | * | 4/1999 | Nagatani | ............... | 359/472 |
| 5,977,718 A | * | 11/1999 | Christensen | ............... | 315/169.1 |

\* cited by examiner

*Primary Examiner* — Audrey Y Chang
(74) *Attorney, Agent, or Firm* — Sutherland, Asbill & Brennan LLP

(57) ABSTRACT

Photostructurable glass and ceramic materials in slabs are processed into pixelized screens having opaque baffles therein for defining therebetween light pipes in the material through which pixel light is passed and directed with limited fields of view and for stereoscopic viewing, the screens being made using various manufacturing processes included focused UV light exposure and baking of the photostructurable material.

20 Claims, 3 Drawing Sheets

STEROSCOPIC DISPLAY SCREEN

BAFFLE PHOTOSTRUCTURING PROCESS

PHOTOSTRUCTURED IMAGING DISPLAY PANELS

FIELD OF THE INVENTION

The invention relates to the field of display monitors and photostructured glass/ceramic materials. More particularly, the invention is related to photostructured display panels having photostructured screens for adjusting fields of views.

BACKGROUND OF THE INVENTION

Photostructurable glass and ceramic materials that are known as photocerams, can be selectively converted from the glass to metasilicate or ceramic state through exposure to ultraviolet (UV) light followed by baking. The process is a basic expose and bake process. The virgin state is visibly clear glass, the unexposed and baked regions remain visibly clear, and the exposed and baked states become optically dark. These dark regions are in a semi-crystalline metasilicate phase or a full ceramic phase. Formation of the full ceramic phase requires baking to a higher temperature. The exposure process is typically done using a UV lamp with a photomask, or more recently, using a laser direct-write technique. U.S. Pat. No. 6,932,933 teaches use of a laser direct-write technique to create true three-dimensional structures in photocerams. This material absorbs light strongly with wavelengths below 300 nm, so the depth of exposure is a function of the wavelength used during exposure. Light at 350 nm wavelength will expose a centimeter or more deep while a 250 nm wavelength will be limited to a few hundred microns. Energy densities of 20 Joules/cm$^2$ are required to expose this material, and the bake cycle to create the metasilicate phase takes about 8 hours. For example, a basic bake process may have a maximum temperature of 600° C. to convert exposed regions to a dark metasilicate phase while another bake has a maximum temperature of 750° C. to convert exposed regions to the full ceramic state. Processed photostructured glass and ceramic materials have opaque and transmissive optical characteristics. Such photostructurable materials include boron oxide, potassium oxide, silica, aluminum oxide, sodium oxide, zinc oxide, lithium oxide, cerium oxide, antimonium trioxide, and silver oxide, among others.

Standard cathode ray tubes and flat panel displays have a large viewing angle. Many applications require a narrow viewing angle for privacy. Notebook computer displays and other portable displays provide poor viewing under bright ambient light conditions and are difficult to read in sunlight. Plastic add-on privacy screens are available, but they degrade image quality and are not robust enough for outdoor applications such as ATMs. Privacy filters for visual displays are usually composed of a series of optical louvers or a holographic image in a plastic sheet that can be added to the front of a display screen. U.S. Pat. No. 6,765,550 teaches a privacy filter apparatus for a notebook computer display. U.S. Pat. No. 6,731,416 teaches a holographic privacy filter for display devices. More complex designs use two sets of grids or require the user to wear polarization-changing eyeglasses such as taught by U.S. Pat. No. 5,528,319 for a privacy filter for a display device and by U.S. Pat. No. 6,650,306 for a security-enhanced display device. The add-on optical films suffer from image degradation due to the inability to accurately align externally applied baffles with individual pixels while the polarization glasses can be cumbersome.

Lenslet arrays for three-dimensional viewing have been used. U.S. Pat. No. 6,974,216 teaches an autostereoscopic 3-D display. The lenslets must be disadvantageously aligned with individual pixels to prevent Moire interference patterns. Complex parallax barriers have also been used. U.S. Pat. No. 6,970,290 B1 teaches a stereoscopic image display device without glasses, which is not suitable for many hand-held applications where the display screen can be placed in the optimum position for stereoscopic vision. Prior viewing displays suffer from interference pattern generation, degraded viewing images, the required use of special viewing glasses, and nonprivate large fields of view. These and other disadvantages are solved or reduced using the invention.

SUMMARY OF THE INVENTION

An object of the invention is to provide a photostructured display screen.

An additional object of the invention is to provide a photostructured display screen composed of a single material.

Another object of the invention is to provide a photostructured display screen having a limited field of view.

Yet another object of the invention is to provide a photostructured display screen providing stereoscopic viewing.

Still another object of the invention is to provide a photostructured display screen manufactured by photolithographic exposure.

A further object of the invention is to provide a photostructured display screen providing stereoscopic viewing using alternating baffled pixel rows.

Yet a further object of the invention is to provide a photostructured display screen for color stereoscopic viewing.

The present invention is directed to photostructured screens and associated displays using photocerams for creating integrated light baffles in the screen. The pixelized baffling of the screen can be used to reduce the field of view for privacy viewing in crowded environments. Each pixel has a baffle that serves as a simple parallax barrier without lenslets and without resulting interference patterns. As such, special polarized viewing glasses are not required for viewing. In a preferred form, alternating rows of baffled pixels provide stereoscopic viewing.

The pixelized baffled photostructured screens maintain image quality by integrating the optical baffles directly into the glass display screen. Optical baffles are created within a photoceram, thereby enabling individual pixels to have individual baffles. A single material is used for the display screen, but the material has an amorphous optically-clear state for viewing pixels and a semi-crystalline or fully crystalline opaque state for creating the light baffles. Use of a single material provides enhanced strength, reduced component complexity, and simplified fabrication. This approach also provides improved readability outdoors by preventing sunlight from reaching the pixels under most conditions. The pixelized baffled photostructured screens can further be used in an autostereoscopic display. The stereoscopic display is for direct stereoscopic viewing without requiring special glasses to be worn by the viewer.

Individual light shields or baffles are created around each pixel in a display panel. These light baffles are embedded in the face sheet by selectively crystallizing the photoceram. The patterning process exposes selected areas of the amorphous glass state with ultraviolet light from a continuous or pulsed source, followed by a thermal bake. The patterning geometry determines the base structure of the light baffles that are designed to register with the display pixels. Individual light emitters or light valves, such as liquid crystals, may be deposited on this patterned glass using standard techniques for manufacturing flat panel displays. The depth of the embedded light shield can be controlled from less than one hundred microns to greater than a centimeter by changing the wavelength of ultraviolet light used in the exposure step. Individual light shields can be parallel, convergent, or divergent; depending on the collimation of the light used during exposure through a mask. These and other advantages will become more apparent from the following detailed description of the preferred embodiment.

DETAILED DESCRIPTION OF THE PREFERRED EMBODIMENT

Figure 1:
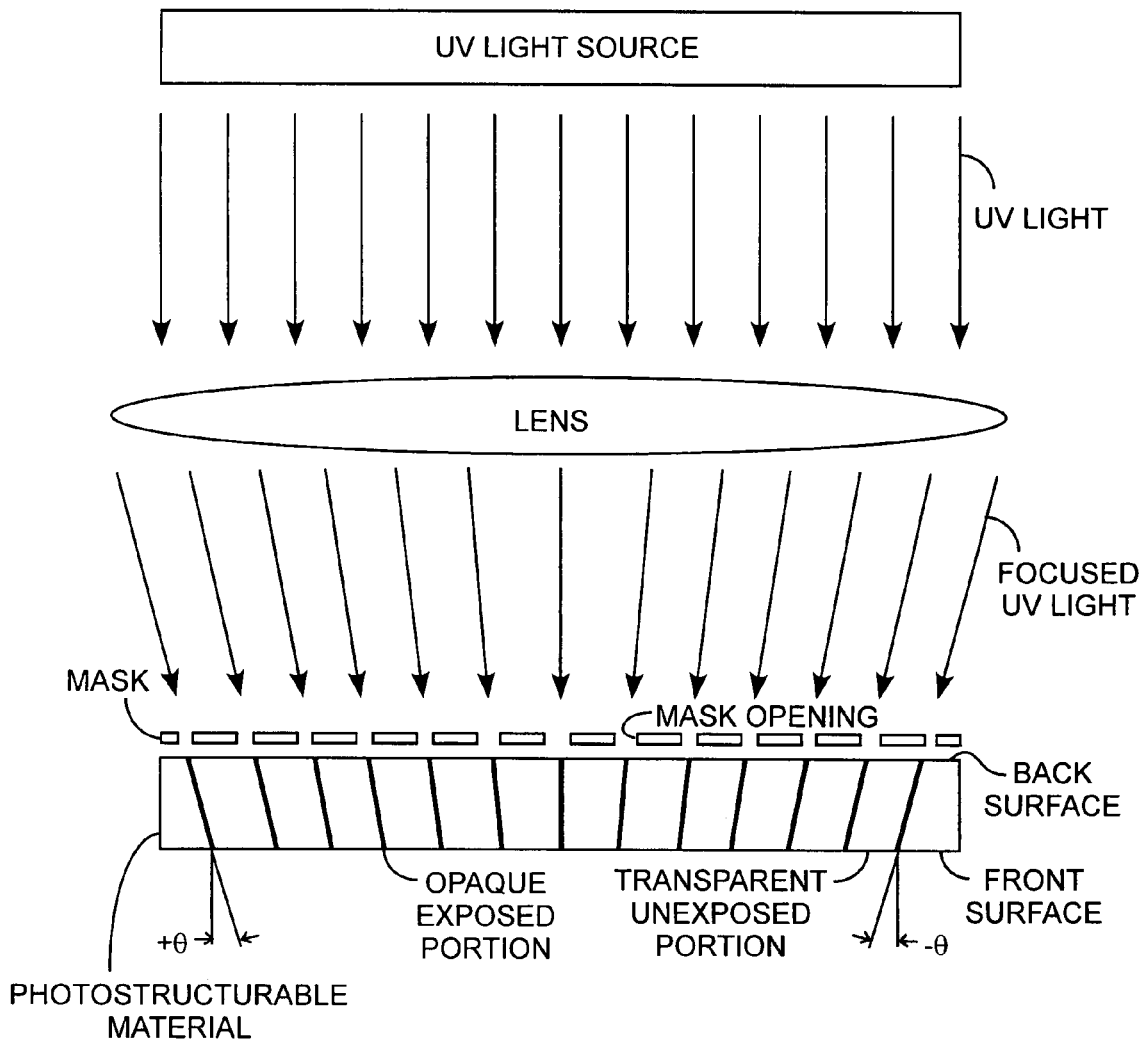
FIG. 1 is diagram of a baffle photostructuring process.

An embodiment of the invention is described with reference to the figures using reference designations as shown in the figures. Referring to FIG. 1, an ultraviolet (UV) source provides UV light directed toward a lens that then provides focused UV light upon a mask. The mask has a series of openings. The mask openings pass collimated focused UV light upon a photostructurable material. The collimated focused UV light through the mask openings creates an opaque exposed portion after the development using a baking photoceram process. Hence, the series of mask openings creates a series of opaque exposed portions in the photostructurable material. Due to the direction of the focused collimated UV light, the corresponding opaque exposed portions, which are baffles, are angled baffles. As shown in the preferred form, the angles of the baffles are aligned to the focused light so that angles of the baffles on the ends of the material are equal but opposite and tending to zero in the center of the focused UV light. The baffles are shown for a single row of pixels. The angles of the baffles incrementally increase from a maximum negative angle $-\theta$, to a center zero angle, and to a maximum positive angle $+\theta$. Between each adjacent pair of opaque exposed portions is a transparent unexposed portion. Hence, the material alternates between opaque exposed portions and transparent unexposed portions. The opaque exposed portion blocks viewing light whereas the transparent unexposed portions pass viewing light. As such, the opaque exposed portions serve as baffles to channel pixelized light through the transparent portions from the maximum negative angle to the maximum positive angle of viewing.

The baffles are in metasilicate and/or ceramic phases that are visually dark and can be used as baffles that surround optically clear light pipes. The photostructured screen can be used in a cathode ray tube or in a flat panel display where the patterned composite glass/ceramic plate surrounds each pixel with a light baffle. These baffles can go partially or completely through the photoceram. Baffle thickness can be as small as the minimum patterned feature size for the metasilicate or ceramic phase which is about twenty-five microns. For a 0.3 mm pixel spacing and a 2.0 mm slab thickness, each baffle will limit the angular dispersion of light from each pixel, viewed from the front surface, to about 8.5°. Wider angles can be created by using larger clear apertures for the same slab thickness, enclosing several pixels each, or by using light baffles that start at the back surface but do not fully penetrate the slab to the front surface. Exposure depth is controlled by exposure wavelength and time-integrated intensity.

The baffles can be made parallel without the use of the lens. Some applications such as a privacy screen that should be viewable from a single point must use optical baffles that are aimed at a common focus. Various processes can be used to generate parallel and non-parallel baffles in any configuration desired for viewing. In the preferred form, the lens has a focal length that is chosen to provide a common focus at the optimum viewing distance from the front of the display. Elimination of the lens results in parallel baffles. When parallel light rays impinge on the mask and glass/ceramic material at off-normal incidence, the resulting baffles can be parallel yet angled to the surface.

A row can be expanded to a complete viewing raster. A sheet, slab, or wafer of clear photostructured glass can be fashioned to have a grid pattern of opaque portions where the ceramic thickness can be equal to, or less than, the sheet thickness. This grid structure can be designed to provide an integrated light shield or baffle around each light-emitting pixel in a display panel to provide a narrow field of view for security, an integrated baffle against sunlight, or an eye-selective filter for stereoscopic three-dimensional displays.

Figure 2A:
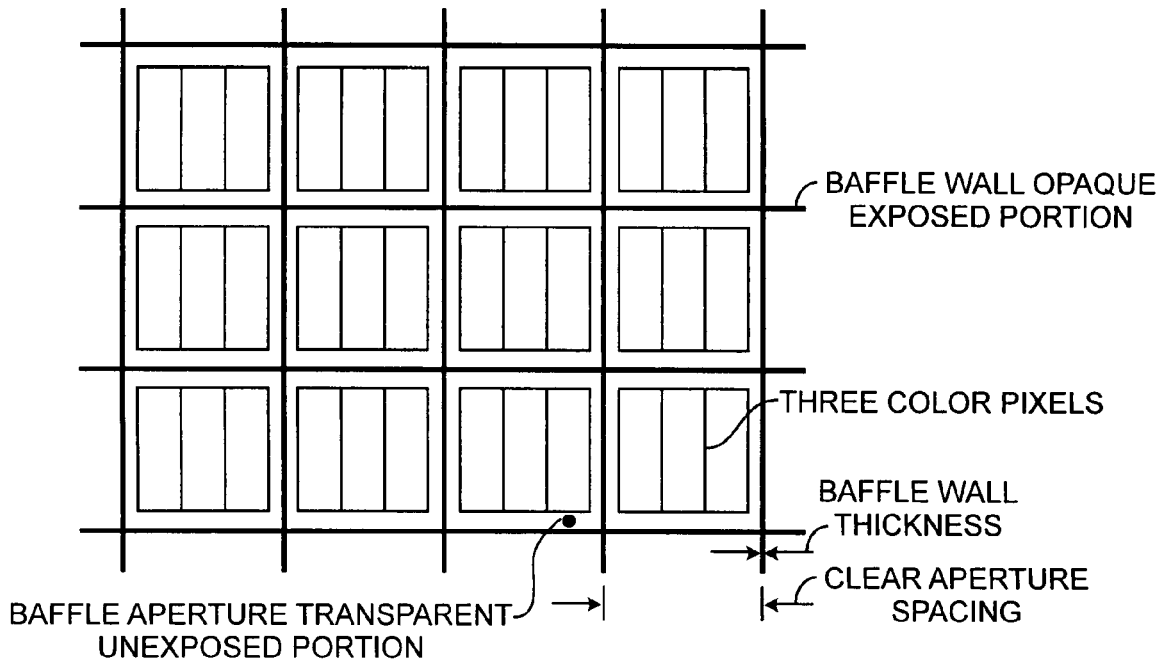
FIG. 2A is a photostructured screen top view.
Figure 2B:
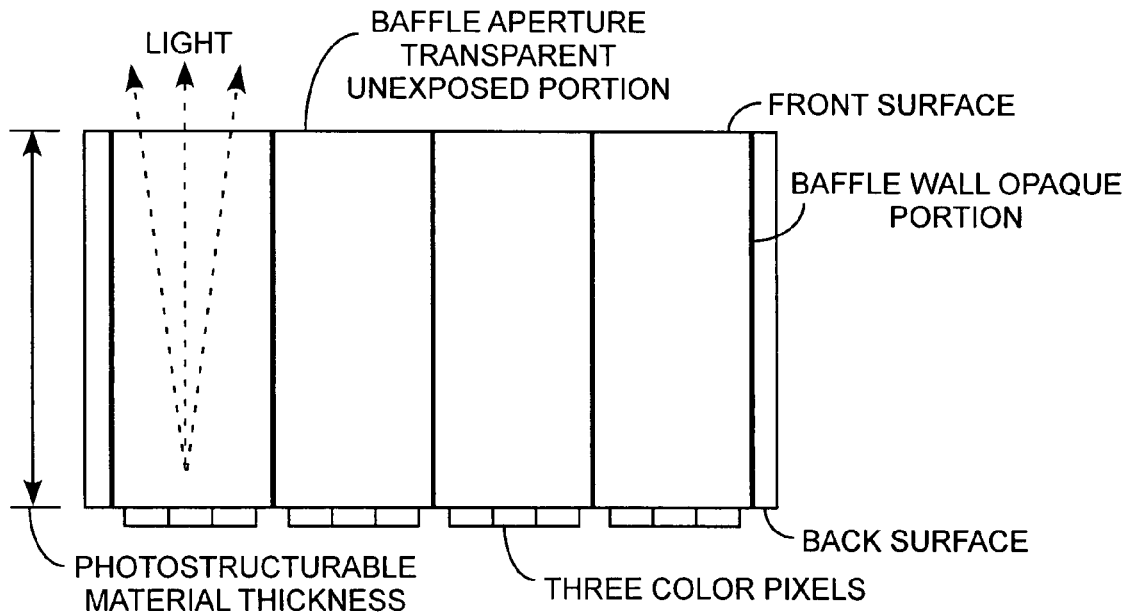
FIG. 2B is a photostructured screen side view.

Referring to FIGS. 1, 2A, and 2B, and more particularly to FIGS. 2A and 2B, a photostructured pixelized baffled screen includes horizontally and vertically extending baffles laid out in a row by column raster of pixels. The baffles extend completely through the screen material thickness from a front viewing surface to a back pixel surface. Hence, the baffles extend down to emitting pixel plane of light emitting pixels. The light emitting pixels may be conventional three-color light emitting pixels. The baffles are shown as baffle walls of exposed portions extending in depth the entire depth of the thickness of the screen, extending horizontally the width of the screen, and extending vertically the height of the screen, thereby forming a baffle around each transparent unexposed portion. In this example, the angles of the baffle walls are zero degrees. That is, the walls are normal to the back and front planes. Each of these baffle apertures is a transparent unexposed portion that serves as a light pipe. The light emitted through each pixel has a limited viewing angle range determined by the geometry of the pixelized light pipes. Each light pipe, having four sides, is defined by clear aperture spacing, and the light pipe is preferably rectangular or square in pixel shape, the depth being greater than the width or height. The pixelized baffled screen provides a raster of baffled pixels using horizontally and vertically extending parallel baffles.

Figure 3:
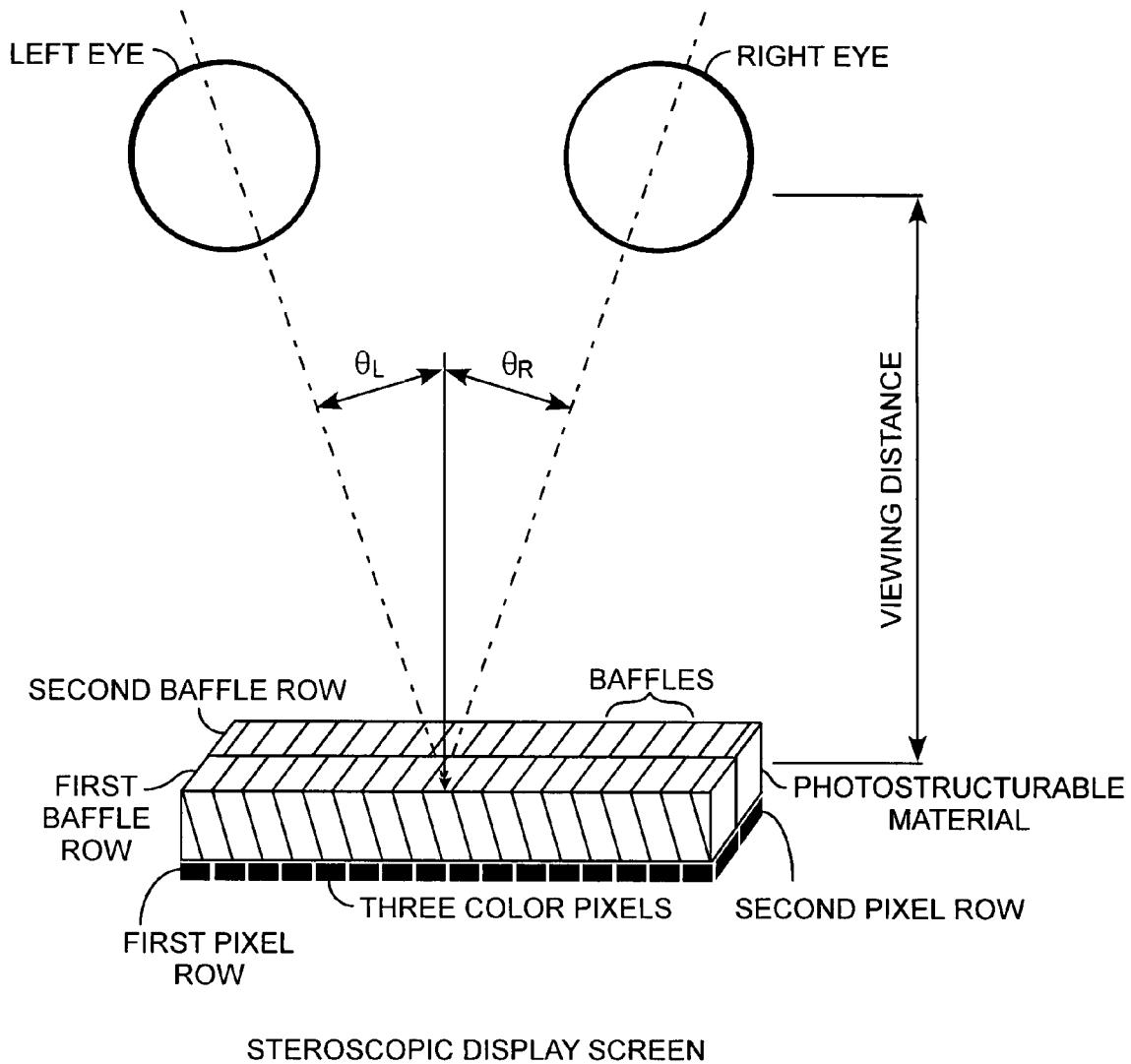
FIG. 3 is a diagram of stereoscopic display.

Referring to all of the Figures, and more particularly to FIG. 3, the photostructurable pixelized baffled screen can be a photostructurable pixelized baffled stereoscopic screen. The baffling provides stereoscopic viewing at fixed viewing distance by a left eye and a right eye of a human being. Stereoscopic displays of photostructured screens have alternating rows of angled baffles with half of the pixels being seen by one eye and the other half of the pixels seen by the other eye. The screen is shown as having alternative rows. But, alternating columns could be used as well. As before, the pixel plane of light emitting three-color pixels are aligned with each baffle in a raster of pixels and respective baffles. The integrated pixelized baffles can be fabricated in three-dimensional stereoscopic displays for direct unassisted human viewing. One fabrication approach is to use two masks. A first mask is used for making the odd rows, including for example, a first baffle row of openings. A second mask is used for making the even rows, including for example, a second baffle row of openings. The even and odd rows have a different incident angle for each mask during the exposure process. The angles of the baffles in the even rows are the same but opposite the angles for the baffles in the odd rows. The first baffled row has parallel baffles all at an angle $-\theta$ for left eye viewing. The second baffled row has parallel baffles all at an angle +θ for right eye viewing. The left eye is positioned for viewing at a left eye angle θL. The right eye is positioned for viewing at a right eye angle θR. During normal viewing, θL=−θR.

The stereoscopic display has even rows that are seen by one eye and odd rows that are seen by the other. The baffle angle ±θ is set for the preferred viewing distance and average human inter-ocular separation of 65-mm. Preferably, the viewing angle θL+θR is larger than the 2θ field-of-view created by individual baffles. For a 2.0 mm thick display screen with 0.3 mm pixel spacing, θL+θR should be greater than 2θ=4.3°. This sets a maximum stereoscopic viewing distance for the average human of 40 cm. This range is adequate for portable electronic games, digital cameras, and cell phones. Stereoscopic display screen applications include outdoor displays, automatic teller machines, automobile displays, GPS receivers, laptops, cell phones, cameras, seat-mounted video displays in airplanes, electronic games, and personal digital assistants, to name a few. The screens can have a narrow field of view that is suitable for use as privacy screens. Large displays can use the focused exposure process as illustrated in FIG. 1, combined with a fixed left/right tilt angle for each row, to ensure that appropriate pixels from the entire display are visible by each corresponding eye. The screens are suitable for personal stereoscopic displays, portable electronic games, and particularly for traveling personal laptops.

Optical baffles are embedded in the glass display screen. The embedded optical baffles can line up with individual pixels with a high degree of baffle to pixel alignment over the entire screen with a narrow field-of-view. This pixel registration can be held over wide temperature range. The optical baffles are rigid and permanent. The pixelized baffled viewing offers a high degree of external light rejection, such as office lighting rejection and sun light rejection. Individual light shields or baffles are created around each pixel in a display panel. These light shields are embedded in the glass face sheet by selectively crystallizing a photoceram. The patterning process exposes selected areas of a virgin sheet with ultraviolet light from a continuous or pulsed source, followed by a thermal bake. The patterning geometry determines the base structure of the light shields that are designed to register with the display pixels. Individual light emitters or light valves, such as liquid crystals, can be deposited on patterned glass using standard techniques for manufacturing flat panel displays. The depth of the light shield can be controlled from less than one hundred microns to greater than a centimeter by changing the wavelength of ultraviolet light used in the exposure step, and by controlling the exposure dose. Individual light shields can be parallel, convergent, or divergent, depending on the collimation of light used during exposure through a mask. While the baffles are used in displays, a baffled screen can be used merely as a viewing-selective lens. For example, such baffled screens could be used in night viewing glasses to block peripheral light rays that would interfere with a desired far-field image.

The screen-embedded baffles enhance the visibility of displays used outdoors such as cameras, cellphones, portable video games, laptops, desk computers, personal televisions, disc players, automobile consoles, digital cameras, personal data assistants, portable music players, cell phones, notebook computers. It also provides narrow viewing angles in order to prevent eavesdropping by viewers not directly in front of the display. This is appropriate for automatic teller machines, customer credit-card swipe terminals, computer monitors, in-seat displays on airlines, and notebook computers. The baffles can be made in a screen of photostructurable material in various rows and columns and at various baffle angles to enhance viewing for any particular application. Those skilled in the art can make enhancements, improvements, and modifications to the invention, and these enhancements, improvements, and modifications may nonetheless fall within the spirit and scope of the following claims.

What is claimed is:

1. A screen for viewing an image, the screen comprising,
baffles defined in a material, the material is a photostructurable material, the material is a plane of material, the baffles being opaque portions of the material, and
pipes defined in the material, the pipes being optically transmissive portions of the material, the baffles defining the pipes, the pipes serving as light pipes for receiving and passing the image through the screen within a field of view, the field of view being defined by baffle geometry;
wherein the baffles comprise the material in a first phase and the pipes comprise the material in a second phase that is different from the first phase.

2. The screen of claim 1 wherein,
the photostructurable material is a photocerams material.

3. The screen of claim 1 wherein,
the photostructurable material is selected from a group consisting of structurable glasses and ceramics.

4. The screen of claim 1 wherein, the baffles are made by exposing the material to focused masked UV light.

5. The screen of claim 1 wherein,
the screen comprises a row of the pipes defined by respective row of baffles,
each of the baffles in the row of baffles have respective angles,
the angles incrementally extend between plus and minus angle θ, and
the angle θ limits the field of view.

6. The screen of claim 1 wherein,
the screen comprises a row of the pipes defined by a respective row of baffles,
each of the baffles in the row of baffles have respective angles,
the angles incrementally extend between plus and minus an angle θ,
the angle θ limits the field of view, and
the baffles are fabricated by a process comprising the step of focusing UV light through a mask having mask openings aligned to the baffles for defining the angles.

7. The screen of claim 1 further comprising,
a pixel plane for generating the image, the pixel plane having light emitting pixels, the pixels being respectively aligned to the baffles.

8. The screen of claim 1 further comprising,
a pixel plane for generating the image, the pixel plane having light communicating pixels, the pixels being respectively aligned to the baffles, the pixels being color emitting pixels.

9. The screen of claim 1 wherein,
a pixel plane for generating the image, the pixel plane having light communicating pixels, the pixels being respectively aligned to the baffles, the pixels comprising color emitters for emitting colored light.

10. The screen of claim 1 wherein,
a pixel plane for generating the image, the pixel plane having light communicating pixels, the pixels being respectively aligned to the baffles, the pixels communicating light by emitting or transmitting light.

11. The screen of claim 1 wherein, the baffles extend horizontally across a width of the material, the baffles extend vertically across a height of the material, the baffles extend in depth a thickness of the material, and the baffles defining the pipes in a row and column raster grid of light pipes.

12. The screen of claim 1 wherein,
the baffles extend horizontally across a width of the material,
the baffles extend vertically across a height of the material,
the baffles extend in depth a partial thickness of the material, and
the baffles defining the pipes in a row and column raster grid of light pipes.

13. The screen of claim 1 further comprising,
a pixel plane for generating the image, the pixel plane having light communicating pixels,
the pixels being respectively aligned to the baffles, wherein,
the baffles extend horizontally a width of the material,
the baffles extend vertically a height of the material,
the baffles extend in depth a thickness of the material, and
the baffles defining the pipes in a row and column raster grid of pipes.

14. The screen of claim 1 further comprising,
a pixel plane for generating the image, the pixel plane having light communicating pixels, the pixels being respectively aligned to the baffles, wherein,
the baffles extend horizontally across a width of the material,
the baffles extend vertically across a height of the material,
the baffles extend in depth a thickness of the material,
the baffles defining the pipes in a row and column raster grid of pipes, and
the baffles extend in depth at angles.

15. The screen of claim 1 further comprising,
a pixel plane for generating the image, the pixel plane having light communicating pixels, the pixels being respectively aligned to the baffles, wherein,
the baffles extend horizontally across a width of the material,
the baffles extend vertically across a height of the material,
the baffles extend in depth a thickness of the material,
the baffles defining the pipes in a row and column raster grid of pipes,
the baffles extend in depth at angles, and
the angles of the baffles in a first row of pipes are different than angles of the baffles in a second row of pipes.

16. The screen of claim 1 further comprising,
a pixel plane for generating the image, the pixel plane having light emitting pixels, the pixels being respectively aligned to the baffles, wherein,
the baffles extend horizontally a width of the material,
the baffles extend vertically a height of the material,
the baffles extend in depth a thickness of the material,
the baffles defining the pipes in a row and column raster grid of pipes,
the baffles extend in depth at angles, and
the angles of the baffles in a first row of pipes are different than angles of the baffles in a second row of pipes for binocular stereoscopic viewing.

17. The screen of claim 1 further comprising,
a pixel plane for generating the image, the pixel plane having light communicating pixels, the pixels being respectively aligned to the baffles, wherein,
the baffles extend horizontally across a width of the material,
the baffles extend vertically across a height of the material,
the baffles extend in depth a thickness of the material,
the baffles defining the pipes in a row and column raster grid of pipes in rows of pipes and columns of pipes,
the baffles extend in depth at angles,
the angles of the baffles in even rows of pipes are different than angles of the baffles in odd row rows of pipes,
the even row pipes for viewing from a first direction, and
the odd row pipes for viewing from a second direction.

18. The screen of claim 1 further comprising,
a pixel plane for generating the image, the pixel plane having light communicating pixels, the pixels being respectively aligned to the baffles, wherein,
the baffles extend horizontally a width of the material,
the baffles extend vertically a height of the material,
the baffles extend in depth a thickness of the material,
the baffles defining the pipes in a row and column raster grid of pipes in rows of pipes and columns of pipes,
the baffles extend in depth at angles,
the angles of the baffles in even rows of pipes are different than angles of the baffles in odd rows of pipes,
the even rows of pipes for viewing from a first direction,
the odd rows of pipes for viewing from a second direction, and
the even rows of pipes and the odd rows of pipes provide for stereoscopic viewing.

19. The screen of claim 1 wherein, the first phase comprises a crystalline phase.

20. A method for forming a screen for viewing an image, comprising:
providing a layer of a photostructurable material;
exposing certain regions of the layer to ultraviolet light;
baking the layer until the exposed regions change in phase to become substantially opaque, thereby forming baffles in the layer, the baffles defining a plurality of light pipes in the material that are substantially optically clear.

* * * * *